Oct. 12, 1965  H. W. DORNBUSH  3,211,956
OVERVOLTAGE PROTECTION FOR STEP VOLTAGE REGULATORS
Filed Sept. 22, 1961
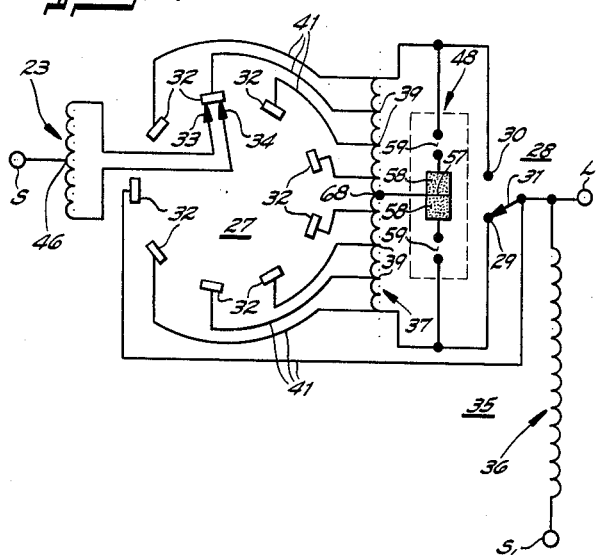
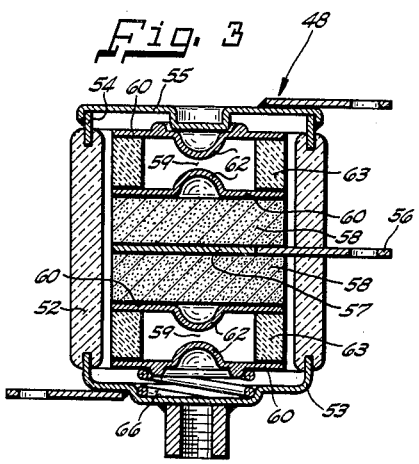
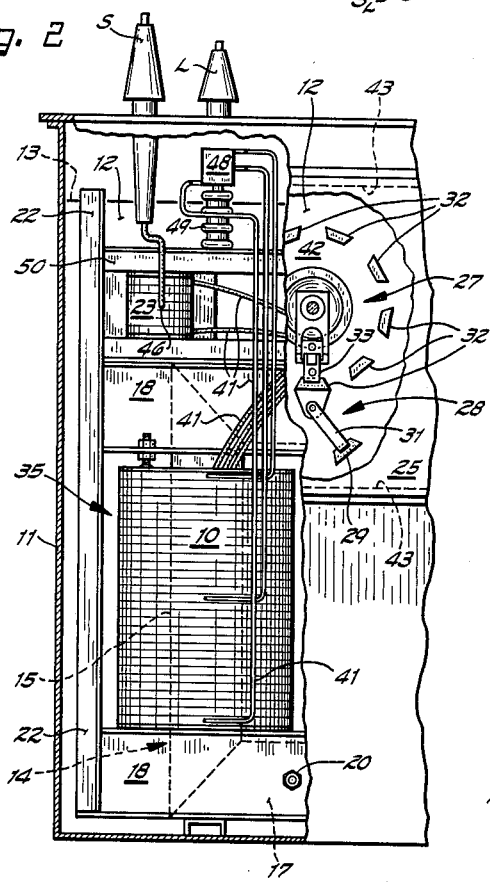
INVENTOR.
Herbert W. Dornbush
BY
Lee H. Kaiser
Attorney United States Patent Office 3,211,956
Patented Oct. 12, 1965

3,211,956
OVERVOLTAGE PROTECTION FOR STEP VOLTAGE REGULATORS
Herbert W. Dornbush, Canonsburg, Pa., assignor to McGraw-Edison Company, Milwaukee, Wis., a corporation of Delaware
Filed Sept. 22, 1961, Ser. No. 139,915
1 Claim. (Cl. 317—15)

This invention relates to stationary induction apparatus and more particularly to means for protecting the series winding of stationary induction apparatus such as step voltage regulators against breakdown from transient electrical waves.

The protection of autotransformers and step regulators, which are a particular type of autotransformer, is complicated because of the voltages that may be induced internally due to the high volts per turn that develop from surges. When a high voltage transient of high frequency or steep wave front is impressed upon the series winding of an autotransformer or step regulator, unique transient-voltage problems are presented which are more severe than encountered with electrically separated windings. Even though the turns in the series winding may be only a fraction of the total turns from high voltage bushing to ground, almost all of the voltage appears across the series winding when a surge is applied to the high voltage bushing and high internal transient voltage oscillations occur within the series winding. A high voltage transient such as may be caused by a lightning stroke may set up cumulative oscillations within the series winding due to resonance resulting in either high gradients or high potentials.

The most severe problem is usually encountered when taps are provided in the series winding, for example, in the tapped series winding of a step voltage regulator. The magnitude of the internal transient is influenced to a large degree by the tap connections of the series winding. On minimum turns connection the idle tap turns can be approximately ten times the active turns in the series winding, and consequently when a surge impinges upon the high voltage terminal, the components of the voltage transient developed in the series winding due to electromagnetic induction are higher and the transient voltages developed across the tap range may equal or exceed the surge voltage applied to the high voltage terminal of the step regulator.

It has been common practice to connect a shunting device such as a lightning arrester across the source and load bushings of a step regulator to provide a bypass for the surge. Although such arrangement limits the voltage across the active turns of the series winding, the voltage across the entire series winding on minimum turns connection can be approximately ten times the voltage across the arrester. Further, a lightning arrester across the source and load bushings does not control the internal transient voltages in the winding and may actually increase them with respect to voltage to ground and between parts of the winding. The sparkover of the shunting device raises the potential of the low voltage terminal of the regulator to a value near that of the high voltage terminal and produces an effect analogous to that obtained by impulsing both ends of the winding. When an impulse wave travels toward the midpoint of the series winding from both ends, a reflection is obtained at the midpoint which tends to double the voltage at that point and permits the midpoint of the series winding to oscillate to a potential considerably higher than the applied potential. Further, when the movable contact is connected to taps near the middle of the series winding, surge current must pass through the active turns of the series winding before it can be suppressed by the lightning arrester shunting the common winding of the regulator.

Protective arrangements for autotransformer series windings are known wherein nonlinear resistances are applied between taps along the series winding, but such shunt resistors are a constant drain on the current and energy of the circuits. Further, in order to reduce the current drain to tolerance values, the resistance values must be increased, and this limits the protection they can afford. Still further, the use of lightning arresters including an air gap and a non-linear resistance between taps of the series winding is both prohibitively expensive and impractical in relatively low voltage apparatus and particularly in step voltage regulators in the distribution voltage range of 15 kilovolts and below. The sparkover potential of the gaps cannot be accurately controlled for the voltage ratings required between the 1.25 percent taps of step regulators for distribution circuit voltage, and the protective characteristics of such low voltage arresters including air gap and nonlinear resistance between taps of a series winding of a distribution voltage step regulator are inferior to those of a single arrester bypassing the series winding having taps.

It is an object of the invention to provide an improved arrangement for protecting the series winding of a step voltage regulator from breakdown under transient electrical waves.

It is a further object of the invention to provide an improved arrangement for protecting the series winding of an autotransformer which is more effective than prior art devices in limiting the amplitude of the oscillations developed in the series winding and in suppressing transient waves impinging upon the autotransformer.

Another object of the invention is to provide an improved lightning arrester protective arrangement for the series winding of a regulator which makes the response of the arrester more selective and positive and improves the protection in comparison to prior art apparatus.

These and other objects and advantages of the invention will be better understood from the following description when taken in connection with the accompanying drawing wherein:

FIG. 1 is a schematic circuit diagram of one phase of a step voltage regulator embodying the invention;

FIG. 2 is a partial front view of a step voltage regulator embodying the protective arrangement of FIG. 1 with portions of the regulator drive means and casing wall broken away to illustrate the internal components; and FIG. 3 is an enlarged cross sectional view of a protective arrester included in the regulator of FIG. 2.

Referring to the drawing, only a single phase of a three phase step voltage regulator is shown and includes a core and coil assembly 10 housed within a casing 11 filled with an insulating dielectric liquid 12 such as transformer oil to a level 13. The step regulator is represented as being of the single-core type. The core and coil assembly 10 is illustrated as being of the core type including a laminated magnetic core 14 having vertical winding legs 15 connected by upper and lower yokes 17. Channel iron upper and lower side frame members 18 are disposed upon opposite sides of the upper and lower yokes 17 and are affixed to the yokes 17 by bolts 20 and are also affixed at their ends to vertical angle iron columns 22. A preventive autotransformer, or bridging reactor 23, is immersed in the insulating dielectric 12 and supported on the upper side frame members 18.

A sealed compartment 25 on a sidewall of casing 11 is filled with insulating dielectric liquid 12 and houses a ratio adjuster, or tap changing device 27 and a reversing switch 28. In FIG. 2 a portion of the wall of compartment 25 and a portion of the ratio adjuster drive means is broken away to illustrate one of the stationary contacts 29 and 30 and the movable contact 31 of the reversing switch 28, the stationary contacts 32 of the ratio adjuster 27 arranged in a circle, and one movable contact 33 of the two movable contacts 33 and 34 of the ratio adjuster 27 adapted to sequentially engage the stationary contacts 32.

A cylindrical coil 35 surrounding winding leg 15 of magnetic core 14 includes a common winding 36 and a series winding 37 (not seen in FIG. 2) linking magnetic core 14. Series winding 37 has a plurality of taps 39 connected to the stationary contacts 32 of tap changer 27 by conductors 41. Electrical connections between the stationary and movable contacts within compartment 25 and the components within casing 11 are made through copper studs (not shown) which extend through a panel board 42 of low loss, low power factor dielectric material which seals an aperture 43 in the tank sidewalls and isolates the interior of the tank 11 from the compartment 25. The ends of the series winding 37 within casing 11 are connected by conductors 41 to the stationary contacts 29 and 30 of the reversing switch 28 within compartment 25. The movable contact 31 of the reversing switch 28 within compartment 25 is connected by a conductor 41 to one end of the common winding 36 and to the low voltage, or load bushing L.

The ratio adjuster 27 is preferably of the type disclosed in the copending application Serial No. 810,489 of Gordon A. Wilson, Jr. filed May 1, 1959 entitled Tap Changer, and the movable contacts 33 and 34 of tap changer 27 within compartment 25 are connected by conductors 41 to the ends of the bridging reactor 23 within casing 11. A midtap 46 on bridging reactor 23 is connected by a conductor 41 to the high voltage, or source bushing S. A bypass arrester 48 disposed above the dielectric liquid 12 within casing 11 protects the series winding 37 from breakdown under transient electrical waves. Bypass arrester 48 is mounted upon an insulator 49, preferably of porcelain, which is supported on horizontal angle iron support members 50 disposed on opposite sides of the upper yoke of the bridging reactor core and affixed at their ends to the vertical columns 22.

Bypass arrester 48 comprises a tubular enclosure 52 (see FIG. 3) of suitable insulating material such as glass with a metallic end plate 53 sealed thereto by fusion at one end and a metal collar 54 sealed thereto by fusion at the opposite end and having an end plate 55 affixed to collar 54 by suitable means such as soldering to define a sealed chamber preferably filled with an inert gas such as nitrogen. A metallic terminal 56 extending through the sidewall of tubular enclosure 52 intermediate the ends thereof is electrically connected to a metallic electrode 57 within enclosure 52. Nonlinear resistance valve disks 58 of a material having a high inverse voltage resistance characteristic and having metallized coatings on the end faces thereof are disposed above and below metallic electrode 57. Arc gaps 59 are connected electrically in series with the nonlinear resistor disks 58 between electrode 57 and the metallic end plates 53 and 55 and each series gap 59 comprises a pair of metallic electrodes 60 having opposed hemispherical embossments 62 spaced apart by an insulating ring 63 and defining an arc gap. A resilient spring 66 of metallic material bearing against one end plate 53 exerts pressure against the stack of electrodes 60, insulating rings 63, valve disks 58 and electrode 57 to maintain electrical contact between the components. The unit 48 thus includes a pair of arrester elements each comprising an arc gap 59 and nonlinear resistor 58 between the electrode 57 and one end plate 53 or 55. A midtap 68 on series winding 37 is connected by a conductor 41 to terminal 56 on arrester 48, and terminals affixed to the end plates 53 and 55 are connected by conductors 41 to opposite ends of series winding 37.

This arrangement of lightning arrester elements between the midtap and the ends of series winding 37 limits the amplitude of the oscillations which can occur within the series winding and accomplishes such result without leakage of current through the arresters. Consequentially, the resistance of the nonlinear valve blocks 58 can be much lower than in prior art schemes wherein nonlinear resistors between taps on the series winding were a constant drain on the current and energy of the circuits. The sparkover potential of the arc gaps 59, each of which shunts half of the series winding 37, can be selected at a sufficiently high value to assure repeated operation of the gap without variation in sparkover potential, and the sealed arrester 48 maintains the gas density and hence the sparkover potential approximately constant independent of variations in temperature, pressure, and humidity. When the ratio adjuster movable contacts 33 and 34 are connected to taps 39 near the middle of series winding 37, the surge current can be suppressed by the lightning arrester element between the midtap 68 and that end of the series winding which reversing switch movable contact 31 engages, and thus the surge current does not have to travel through the active turns of the series winding before it can be suppressed as in prior art apparatus wherein an arrester was connected across the S and L bushings of the step regulator. Such prior art apparatus, with a single arrester across the S and L bushings, at times permitted the midpoint of the series windings to reach a voltage to ground, due to oscillations, which was more than double that of the applied wave, and it will be apparent that the disclosed protective arrangement with arrester between the midtap and each end of the series windings will limit the amplitude of the oscillations permitted to develop within the series winding 37, following the impact of a transient wave, to a relatively small percentage above the crest value of the applied transient wave. An excessive voltage concentration across either half of the series winding 37 causes the corresponding arrester element to sparkover and the resistance of the nonlinear resistor to drop so that the voltage of midtape 68 will be fixed and the maximum voltage to ground of any portion of the winding is reduced in comparison to prior art devices. The disclosed construction is relatively simple and inexpensive in comparison to apparatus having arresters between taps of a series winding and provides better protection in low voltage class step regulators. Further, the invention provides greatly improved protection in comparison to conventional apparatus having a lightning arrester shunting the entire series winding.

While only a single embodiment of the invention has been illustrated and described, many modifications and variations thereof will be apparent to those skilled in the art, and consequently it is intended in the appended claim to cover all such modifications and variations which fall within the true spirit and scope of this invention.

What I claim as new and desire to secure by Letters Patent of the United States is:

In a step voltage regulator, the combination of a casing, liquid dielectric within said casing, an autotransformer core and coil assembly immersed in said dielectric within said casing including a magnetic core and common and series windings linking said core, said series winding having a plurality of taps, a ratio adjuster having a plurality of stationary contacts connected to said taps and movable contact means adapted to sequentially engage said stationary contacts, said series winding also having a midtap, a lightning arrester unit within said casing above said liquid dielectric including a sealed enclosure housing a single resistor means with a substantially exponential resistance ampere characteristic, a point intermediate the ends of said resistor means being connected to said midtap on said series windings, said enclosure also housing two pair of spaced apart metallic electrodes each pair of which defines a series gap, said spark gaps being electrically connected between the ends of said resistor means and the ends of said series winding, and an inert gas filling said sealed enclosure, whereby the breakdown voltage of said series gaps is substantially constant and independent of changes in temperature and pressure.

References Cited by the Examiner
UNITED STATES PATENTS

| | | | |
|---|---|---|---|
| 496,918 | 5/93 | Thomson | 317—67 |
| 1,300,127 | 4/19 | Creichton | 317—14.3 |
| 2,050,334 | 8/36 | Kellog | 317—68 X |
| 2,138,652 | 11/38 | Biermanns | 323—43.5 |
| 2,276,855 | 3/42 | Meador | 317—14 |

SAMUEL BERNSTEIN, *Primary Examiner.*